United States Patent Office
3,446,814
Patented May 27, 1969

3,446,814
PROCESS FOR THE PREPARATION OF
SUBSTITUTED OXAZOLIDONES
Manfred Budnowski, Dusseldorf-Holthausen, Germany, assignor to Henkel & Cie GmbH, Dusseldorf-Holthausen, Germany, a corporation of Germany
No Drawing. Filed July 19, 1966, Ser. No. 566,254
Claims priority, application Germany, July 24, 1965, H 56,674
Int. Cl. C07d 85/28
U.S. Cl. 260—307   7 Claims

ABSTRACT OF THE DISCLOSURE

The present invention relates to a process for the preparation of oxazolidones-(2) substituted in the 5 position of the formula

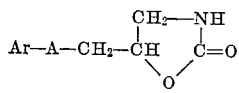

wherein Ar represents an aryl radical and A represents an oxygen or sulfur atom, which comprises reacting triglycidyl isocyanurate with compounds of the formula Ar—A—H wherein Ar and A have the above-assigned meanings.

THE PRIOR ART

It is common knowledge, that 5-(aryloxymethyl)-oxazolidones-(2) represent valuable sedatives and muscle relaxants. These compounds can be prepared, for example, by reaction of a phenylglycidylether, if desired substituted on the phenyl radical, with an alkylurethane. According to another known process, 5-(aryloxymethyl)-oxazolidones-(2) are obtained by reaction of aryloxypropandiols with urea. According to still another process, urea is reacted with a compound, substituted on the phenyl radical, of the formula $$C_6H_5—O—CH_2—CHOH—CH_2X$$

wherein X may have the meaning of a halide atom, a hydroxy group or a carbamoyloxy group.

Furthermore, 5-[aryloxymethyl]-oxazolidones-(2) can be obtained by reaction of dialkyl carbonates or phosgene with compounds, substituted on the phenyl radical, of the formula $$C_6H_5—O—CH_2—CHOH—CH_2—NH—R$$

wherein R is a hydrogen atom or a lower molecular weight alkyl radical.

OBJECTS OF THE INVENTION

An object of the present invention is the development of a process for the preparation of 5-substituted oxazolidones of the formula

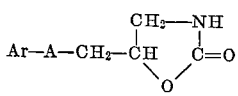

wherein Ar is an aryl, and A is a member selected from the group consisting of oxygen and sulfur which comprises reacting triglycidyl isocyanurate with compounds of the formula Ar—A—H wherein Ar and A have the above-assigned meanings at a temperature between about 60° C. and about 240° C., and recovering said 5-substituted oxazolidones.

These and other objects of the invention will become more apparent as the description thereof proceeds.

DESCRIPTION OF THE INVENTION

In all of the process of the prior art previously discussed, it is necessary, first of all to convert phenol into the corresponding phenylether, for example the phenylglycidylether. However, by means of the process of the invention, it is possible to convert phenols or thiophenols directly into the desired 5-substituted oxazolidone-(2) in a one-step process, obtaining very good yields.

The present invention relates to a process for the preparation of 5-substituted oxazolidones-(2) of the formula

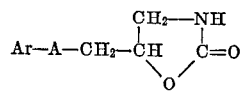

wherein Ar is an aromatic or a heterocyclic-aromatic radical, and A is an oxygen or a sulfur atom, characterized in that triglycidyl isocyanurate is reacted with compounds of the formula Ar—A—H wherein Ar and A have the above meaning, at temperatures of 60–240° C. either directly or, if so desired, in the presence of proton acceptors and/or organic solvents.

The compounds of the general formula Ar—A—H, used as starting substances, contain as aromatic radicals for example the phenyl radical, which can also be substituted. As substitutes are considered for example the following: alkyl groups, aryl radicals, halide atoms, nitro groups, ether groups, thioether groups, ester groups, acyl radicals, sulfonyl radicals, amino groups and others. Preferentially, the aromatic radicals are phenyl, alkylphenyl, naphthyl, phenyl-phenyl, halophenyl, nitrophenyl, alkoxyphenyl, alkylmercaptophenyl, alkanoyloxy-phenyl, carbalkoxyphenyl, alkanoylphenyl, alkylsulfonylphenyl, aminophenyl and alkylaminophenyl.

Suitable compounds are for example: phenol, cresols, isomeric ethyl- or isopropylphenols, the phenyl-phenols, the xylenols, the trimethylphenols, the mono-, di- or trichlorophenols, or -bromophenols, nitrophenols, guaiacol, p-aminophenol, the isomeric dimethylaminophenols, the methylmercaptophenols, monoacetyl hydroquinone and numerous other compounds. The invention is not limited to those compounds mentioned in the preceding, which are merely listed as examples and the enumeration of which is by no means exhaustive.

In the place of the phenols, corresponding thiophenols can be used, also naphthols and substituted naphthols and derivatives of other aromatic substances.

Moreover, hydroxy- or mercapto derivatives of aromatic-heterocyclic compounds, corresponding in their chemical behavior to the phenols or thiophenols are also suitable as, for example, hydroxythiophenes or the mercaptopyridines.

The triglycidyl isocyanurate also serving as starting material, can, according to the processes described in the co-pending, commonly assigned United States patent applications Ser. No. 288,593, filed June 18, 1963, now Patent No. 3,288,789 or Ser. No. 467,140 filed June 25, 1965, now Patent No. 3,300,490, be obtained in a simple manner in pure, crystallized form from cyanuric acid and epichlorohydrin. Triglycidyl isocyanurate exists in two diastereomeric forms with different melting points (106° and 158° C.). For the present reaction both forms, either separately or in mixture can be utilized.

The reaction is accomplished in such a manner, that 3 mols of the respective phenol or thiophenol react with 1 mol of triglycidyl isocyanurate. Therefore, it is advantageous to use the reactants in a mol ratio of about 3:1. Of course, the compound Ar—A—H can also be used in excess, advantageously up to about 3.5 mol per 1 mol of triglycidyl isocyanurate. This is especially advantageous, when the compound Ar—A—H is easily volatile, so that the excess can readily be removed. It is less advisable to use the compound As—A—H in deficiency, as in this case, as a rule, mixtures of various reaction products are obtained.

Advantageously the reaction according to the invention is carried out in an organic solvent. Suitable are, for example, benzene, toluene, chlorobenzene, dimethylformamide, dimethylsulfoxide, acetone and others. It was observed, that the reaction proceeds more rapidly in polar solvents than in non-polar solvents.

Further advantageously, the reaction according to the invention is conducted in the presence of a proton acceptor. As proton acceptors, the following can be used, for example: alkali metal hydroxides such as sodium hydroxide or potassium hydroxide; alkali metal alkylates, such as sodium methylate and sodium ethylate; alkali metal carbonates, such as sodium carbonate; tertiary organic bases, such as dimethylaniline or dimethylbenzylamine; or quaternary ammonium compounds such as trimethylbenzyl ammonium chloride. The proton acceptors are active in relatively small amounts. In general, an addition of 0.001–0.1 equivalent of the proton acceptors per 1 mol of the compound Ar—A—H has been found sufficient. However, if the reaction is conducted in these organic solvents, which simultaneously possess properties of proton acceptors, as for example dimethylformamide, anisol, acetophenone, benzophenone, dimethylsulfoxide, benzonitrile and acetonitrile, a further addition of the previously named compounds becomes, as a rule, superfluous. The reaction occurs more rapidly and at lower temperatures when proton acceptors and/or organic solvents are employed. However, the reaction also occurs in the absence of either at elevated temperatures up to about 240° C.

To conduct the reaction according to the invention, for example, triglycidyl isocyanurate and the compound Ar—A—H are dissolved in a suitable organic solvent with, if desired, proton acceptor activity, and the mixture is heated, possibly after the addition of a small amount of a proton acceptor, advantageously until the epoxide-oxygen content of the solution has been reduced to zero or, when an excess of triglycidyl isocyanurate is used, to a constant value. The reaction temperature may fluctuate within broad limits for example between 60° and 240° C. In many cases it is advisable to conduct the reaction at the reflux temperature of the organic solvent employed. Inasmuch as the reactants are not apt to decompose at elevated temperatures of about 180°–240° C., the reaction may be carried out without any solvents.

The working up of the reaction products is quite simple. In the case that the compounds do not crystallize from the solution while cooling, they can easily be crystallized after the evaporation of the solvent and isolated by recrystallization in a pure form.

The following specific embodiments are illustrative of the invention. They are not however to be deemed limitative in any respect.

Example 1

29.7 gm. (1/10 mol) of a technical mixture consisting of about 3 parts of the low-melting form (α form) and about 1 part of the high-melting form (β form) of triglycidyl isocyanurate and 29 gm. of phenol (3/10 mol) were heated together with 350 ml. of chlorobenzene and 1 gm. of pulverized potassium hydroxide for 40 minutes at reflux, after which period, the epoxide-oxygen content of the solution was reduced to zero. Next, most of the solvent was distilled therefrom under low pressure (water-jet vacuum pump). The residue was mixed with 250 ml. of ethanol and heated. The solution obtained was filtered at a high temperature.

After cooling, the precipitated crystals were filtered and washed with a small amount of alcohol. 53 gm. (92% of the theory) of 5-phenoxymethyl-oxazolidone-(2) were obtained. The substance had first a melting point of 118° C. and after repeated recrystallization from alcohol or water the melting point was raised to 122° C. The product was identical to that compound prepared by another method, described by Beasley et al., J. Pharmacy Pharmacol., 9 (1957), page 10.

Example 2

29.7 gm. of the low-melting form (α form) of triglycidyl isocyanurate and 29 gm. of phenol were refluxed together with 350 ml. of toluene and 30 mg. of pulverized sodium hydroxide for 16 hours. After this period the epoxide-oxygen content of the solution had been reduced to zero. The reaction mixture was worked up as described in Example 1. The yield amounted to 49 gm. (85% of the theory) of 5-phenoxymethyloxazolidone-(2).

The above mixture was again prepared, but instead of the low-melting form, the identical amount of the high-melting form of triglycidyl isocyanurate was used. In this case the reaction time lasted 17 hours and again a yield of 49 gm. of 5-phenoxymethyl-oxazolidone-(2) (85% of and theory) were obtained.

Example 3

The process described in Example 2 was repeated; however, instead of toluene, xylol was used as solvent and the amount of sodium hydroxide was increased to 250 mg. The sump temperature was 140° C. The reaction time until the disappearance of epoxide-oxygen lasted 6 hours. The yield amounted to 47 gm. (81% of the theory) of 5-phenoxymethyl-oxazolidone-(2).

The same experiment was repeated, using 1 gm. of potassium hydroxide as catalyst in the place of 250 mg. of sodium hydroxide. In this case the reaction time was reduced to 2½ hours. The yield obtained was 50 gm. (86% of the theory).

The same mixture was used once more, but instead of sodium hydroxide or potassium hydroxide, 250 mg. of dimethylbenzylamine were added as a substance giving an alkaline reaction. The reaction period lasted 2½ hours. The yield amounted to 44 gm. of 5-phenoxymethyl-oxazolidone-(2) (76% of the theory).

Example 4

29.7 gm. of the low-melting form (α form) of the triglycidyl isocyanurate and 29 gm. of phenol, together with 350 ml. of technical dimethyl formamide and 1 gm. of pulverized KOH, were treated while stirring to 140° C. After a reaction time of 30 minutes the epoxide-oxygen content of the solution was reduced to zero. The final processing carried out in the same manner as described in Example 1, yielded 49 gm. (85% of the theory) of 5-phenoxymethyl-oxazolidone-(2).

This test was repeated. However, in place of dimethylformamide, chlorobenzene was employed as solvent, and the solution was refluxed. The reaction duration lasted also 30 minutes, the yield was 46 gm. (80% of the theory) of 5-phenoxymethyl-oxazolidone-(2).

Example 5

29.7 gm. of triglycidyl isocyanurate (β form) and 33 gm. of p-amino-phenol were refluxed with 500 mg. of pulverized sodium hydroxide in 500 ml. of toluene over a period of 12 hours. Thereafter, the solvent was distilled, and the residue formed was recrystallized from water. In this way, 35 gm. (56% of the theory) of 5-(p-aminophenoxymethyl)-oxazolidone-(2) were obtained. The product had a melting point of 183° C.

*Analysis.*—Calculated: C, 57.8%; H, 5.8%; N. 13.5%; molecular weight, 208. Found: C, 57.4%; H, 5.9%; N, 13.1%; molecular weight, 220 (osmometer).

Example 6

29.7 gm. of triglycidyl isocyanurate (α form) and 41.2 gm. of m-dimethylaminophenol together with 1 gm. of pulverized potassium hydroxide in 300 ml. of chloroform were refluxed over a period of 10 hours. The product was worked up in the same manner as described in Example 5. 33.5 gm. (46% of the theory) of 5-(m-dimethylamino - phenoxymethyl) - oxazolidone-(2) were obtained. The compound had a melting point of 124° C.

Analysis.—Calculated: C, 61%; H, 6.8%; N, 11.9%; molecular weight, 236. Found: C, 61.2%; H, 7%; N, 11.6%; molecular weight, 240.

Example 7

29.7 gm. of triglycidyl isocyanurate (α form) and 37.8 gm. of m-xylenol together with a catalyst mixture consisting of 150 mg. of pulverized sodium hydroxide and 150 mg. of trimethylbenzyl ammonium chloride in 300 ml. of chlorobenzene were refluxed for 13 hours. The reaction product was recrystallized from chlorobenzene, and 50.5 gm. (76% of the theory) of 5-(3',5'-dimehtyl-phenoxymethyl)-oxazolidone-(2) were obtained. The melting point of the product obtained was 122° C.

Example 8

29.7 gm. of triglycidyl isocyanurate (α form) and 39.6 gm. of p-chlorophenol together with a catalyst mixture consisting of 150 mg. of pulverized sodium hydroxide and 150 mg. of trimethylbenzyl ammonium chloride in 300 ml. of chlorobenzene were refluxed over a period of 12 hours. The excess chlorobenzene was distilled and the residue was recrystallized from a mixture of 50% chlorobenzene and 50% ethanol. 65 gm. (95% of the theory) of 5-(p-chlorophenoxymethyl)-oxazolidone-(2) were obtained. The product had a melting point of 148° C.

Analysis.—Calculated: C, 52.7%; H, 4.4%; N, 6.2%; molecular weight, 228. Found: C, 52.8%; H, 4.5%; N, 6.1%; molecular weight, 225.

Example 9

29.7 gm. of triglycidyl isocyanurate (α form) and 37.7 gm. of guaiacol together with 300 mg. of pulverized sodium hydroxide in 350 ml. of toluene were refluxed over a period of 16 hours. After the excess toluene had been evaporated, the residue was recrystallized from ethanol. 65 gm. (98% of the theory) of 5-(o-methoxyphenoxymethyl)-oxazolidone-(2) were obtained. This product had a melting point of 142° C.

Example 10

29.7 gm. of triglycidyl isocyanurate (α form) and 43.3 gm. of α-naphthol, together with a catalyst mixture consisting of 150 mg. of pulverized sodium hydroxide and 150 mg. of trimethylbenzyl ammonium chloride in 300 ml. of chlorobenzene, were refluxed for 18 hours. The residue was, subsequent to the distillation of the excess solvent, recrystallized from chlorobenzene. Thus 61.5 gm. (85% of the theory) of 5-(α-naphthoxymethyl)-oxazolidone-(2) were obtained. The product had a melting point of 121° C.

Analysis.—Calculated: C, 69.1%; H, 5.4%; N, 5.8%; molecular weight, 243. Found: C, 69.2%; H, 5.6%; N, 5.8%; molecular weight, 251.

Example 11

29.7 gm. of triglycidyl isocyanurate (α form) and 43.3 gm. of β-naphthol were, together with a catalyst mixture consisting of 150 mg. of pulverized sodium hydroxide and 150 mg. of trimethylbenzyl ammonium chloride in 150 ml. of chlorobenzene, refluxed for 12 hours. The obtained product, namely 5-(β-naphthoxymethyl)-oxazolidone-(2) was recrystallized from ethanol, and a yield of 68 gm. (93% of the theory) was obtained. The product had a melting point of 190° C.

Analysis.—Calculated: C, 69.1%; H, 5.4%; N, 5.8%; molecular weight, 243. Found: C, 69.4%; H, 5.3%; N, 6.0%; molecular weight, 248.

Example 12

29.7 gm. of triglycidyl isocyanurate (β form) and 33.3 gm. of thiophenol together with 500 mg. of pulverized sodium hydroxide in 250 ml. of chlorobenzene were heated at a temperature of 120° C. over a period of 9 hours. The reaction product was recrystallized from isopropanol. 61 gm. (97% of the theory) of 5-phenthiomethyl-oxazolidone-(2) were obtained. The product had a melting point of 70° C.

Analysis.—C, 57.4%; H, 5.3%; N, 6.7%; S, 15.3%; molecular weight, 209. Found: C, 57.6%; H, 5.6%; N, 6.8%; S, 15.6%; molecular weight, 208.

Example 13

29.7 gm. of triglycidyl isocyanurate (α form) and 44.3 of p-methyl-mercaptophenol together with 500 mg. of pulverized sodium hydroxide in 350 ml. of toluene were refluxed for 5 hours. The reaction mixutre was recrystallized from toluene, thus obtaining a yield of 68 gm. (95% of the theory) of 5-(p-methylmercapto-phenoxy-methyl)-oxazolidone-(2). The product had a melting point of 142° C.

Analysis.—Calculated: C, 55.2%; H, 5.4%; N, 5.8%; S, 13.4%; molecular weight, 239. Found: C, 55.6%; H, 5.8%; N, 5.6%; S, 13.6%; molecular weight, 231.

Example 14

29.7 gm. triglycidyl isocyanurate (β form) and 33.4 gm. of 2-mercaptopyridine were refluxed with 500 mg. of pulverized sodium hydroxide in 300 ml. of chlorobenzene at 100° C. for 10 hours. A resin-like product was obtained in a quantitative yield.

Analysis.—Calculated: N, 13.3%; S, 15.2%. Found: N, 12.9%; S, 15.3%.

Example 15

29.7 gm. of triglycidyl isocyanurate (β form) and 27.5 gm. of phenol were carefully heated while stirring to 200° C. After the heating was terminated, the temperature still increased up to 225° C. After 10 minutes the reaction mixture was cooled to 80° C. and diluted with the same volume of ethanol. After the usual working-up, 53.3 gm. (92% of the theory) of 5-phenoxymethyl-oxazolidone-(2) were obtained.

Example 16

The working process as described in Example 15 was repeated; however, 0.2 gm. of tetramethyl ammonium chloride were added. The reaction commenced already at a temperature of 150° C. Even after the heating had been terminated, the temperature rose to 230° C. By means of the same working-up process, 52 gm. (90% of the theory) of 5-phenoxymethyl-oxazolidone-(2) were obtained.

The preceding specific embodiments are illustrative of the process of the inventon. It is to be understood, however, that other expedients known to those skilled in the art may be employed without departing from the spirit of the invention.

I claim:

1. A process for the preparation of 5-substituted oxazolidones of the formula

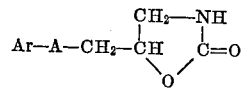

wherein Ar is an aryl selected from the group consisting of phenyl, alkylphenyl, naphthyl, phenyl - phenyl, halophenyl, nitrophenyl, alkoxyphenyl, alkylmercaptophenyl, alkanoyloxy - phenyl, pyrridinyl, amino - phenyl and alkylaminophenyl, and A is a member selected from the group consisting of oxygen and sulfur which comprises reacting triglycidyl isocyanurate with compounds of the formula Ar—A—H wherein Ar and A have the above-assigned meanings at a temperature between about 60° C. and about 240° C. and recovering said 5-substituted oxazolidones.

2. The process of claim 1 wherein said reaction is conducted in the presence of an organic solvent.

3. The process of claim 2 wherein said organic solvent is a proton acceptor.

4. The process of claim 1 wherein said reaction is conducted in the presence of a proton acceptor.

5. The process of claim 1 wherein said reaction is conducted in the presence of both an organic solvent and a proton acceptor.

6. The process of claim 1 wherein from 3 to 3.5 mols of the compound

Ar—A—H is employed per mol of triglycidyl isocyanurate.

7. The process of claim 6 wherein said reaction is conducted in the presence of an organic solvent and a proton acceptor at the reflux temperature of said solvent.

References Cited

UNITED STATES PATENTS

| 3,168,525 | 2/1965 | Baizer | 260—307 |
| 3,184,503 | 5/1965 | Baizer | 260—482 |
| 3,251,836 | 5/1966 | Fischer et al. | 260—243 |

ALEX MAZEL, *Primary Examiner.*

R. V. RUSH, *Assistant Examiner.*